(12) United States Patent
McPherson

(10) Patent No.: US 10,315,729 B2
(45) Date of Patent: Jun. 11, 2019

(54) SHIP HULL MICROBUBBLE SYSTEM

(71) Applicant: Kevin M McPherson, Portland, OR (US)

(72) Inventor: Kevin M McPherson, Portland, OR (US)

(*) Notice: Subject to any disclaimer, the term of this patent is extended or adjusted under 35 U.S.C. 154(b) by 0 days.

(21) Appl. No.: 15/828,114

(22) Filed: Nov. 30, 2017

(65) Prior Publication Data
US 2018/0148131 A1 May 31, 2018

Related U.S. Application Data

(60) Provisional application No. 62/428,395, filed on Nov. 30, 2016.

(51) Int. Cl.
*B63B 1/38* (2006.01)
*B63B 1/04* (2006.01)

(52) U.S. Cl.
CPC .............. *B63B 1/042* (2013.01); *B63B 1/38* (2013.01); *Y02T 70/121* (2013.01); *Y02T 70/122* (2013.01)

(58) Field of Classification Search
CPC .............. B63B 1/38; B63B 2001/385; B63B 2001/387
See application file for complete search history.

(56) References Cited

U.S. PATENT DOCUMENTS

| | | | |
|---|---|---|---|
| 4,546,719 A * | 10/1985 | Collins | B63B 1/38 114/121 |
| 5,575,232 A | 11/1996 | Kato | |
| 6,356,816 B1 | 3/2002 | Katz | |
| 8,201,511 B1 | 6/2012 | Harbin | |
| 2011/0259440 A1 | 10/2011 | Kawashima et al. | |
| 2012/0247383 A1 | 10/2012 | Wu et al. | |
| 2013/0269589 A1 | 10/2013 | Kapteijn | |
| 2014/0030118 A1 | 1/2014 | Costas et al. | |
| 2016/0251060 A1* | 9/2016 | Costas | B63B 1/38 114/67 A |

FOREIGN PATENT DOCUMENTS

| | | |
|---|---|---|
| WO | WO2014184585 A2 | 11/2014 |
| WO | WO2015133899 A1 | 9/2015 |

* cited by examiner

*Primary Examiner* — Andrew Polay
(74) *Attorney, Agent, or Firm* — Plager Schack LLP

(57) ABSTRACT

A ship hull microbubble system is adapted to reduce drag on a ship hull traveling through water. The ship hull microbubble system includes a ballast pump, mechanically coupled to a ballast main pipe which is further connected to a forward peak tank with a forward peak tank valve. A venturi injector is joined to the ballast main pipe with a riser pipe. A discharge pipe is joined to the venturi injector and further piercing the ship hull. An air water mixture is formed when water pulled into the ballast pump receives air from the venturi injector. Discharging the air water mixture through the discharge pipe creates a plurality of microbubbles against the ship hull that reduces the drag on the ship hull when travelling through water.

2 Claims, 4 Drawing Sheets

US 10,315,729 B2

SHIP HULL MICROBUBBLE SYSTEM

RELATED APPLICATION

This application claims priority to provisional patent application U.S. Ser. No. 62/428,395 filed on Nov. 30, 2016, the entire contents of which is herein incorporated by reference.

BACKGROUND

The embodiments herein relate generally to shipboard mechanical systems in a field commonly called marine engineering.

Prior to embodiments of the disclosed invention, power driven marine vessels were inefficient in fuel consumption as a result of drag against the hull of the marine vessel. Embodiments of the current invention solve this problem.

SUMMARY

A ship hull microbubble system is adapted to reduce drag on a ship hull traveling through water. The ship hull microbubble system includes a ballast pump, mechanically coupled to a ballast main pipe which is further connected to a forward peak tank with a forward peak tank valve. A venturi injector is joined to the ballast main pipe with a riser pipe. A discharge pipe is joined to the venturi injector and further piercing the ship hull. An air water mixture is formed when water pulled into the ballast pump receives air from the venturi injector. Discharging the air water mixture through the discharge pipe creates a plurality of microbubbles against the ship hull that reduces the drag on the ship hull when travelling through water.

As used in this application a "mirco bubble" is a bubble having a diameter greater than or equal to one micron.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
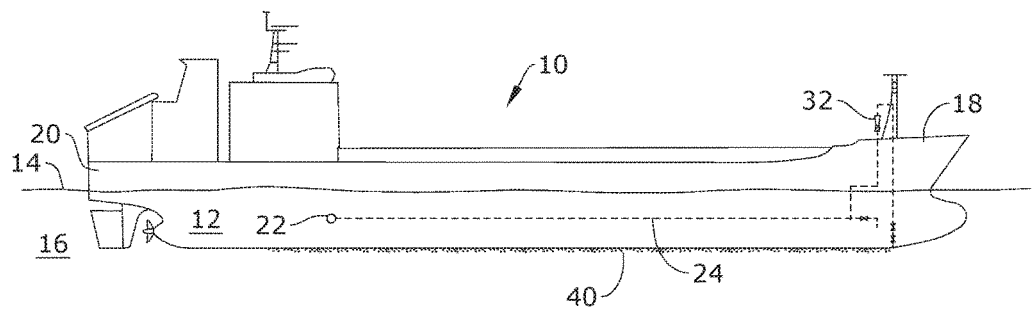
FIG. 1 shows a schematic view of one embodiment of the present invention.

By way of example, and referring to FIG. 1, one embodiment of the ship hull microbubble system 10 further comprises a ship hull 12 at least a portion of which extends below a waterline 14 when the ship hull 12 is placed in water 16. The ship hull 12 further comprises a bow 18 in a forward direction and a stern 20 in an after direction using the convention common in naval architecture.

Figure 2:
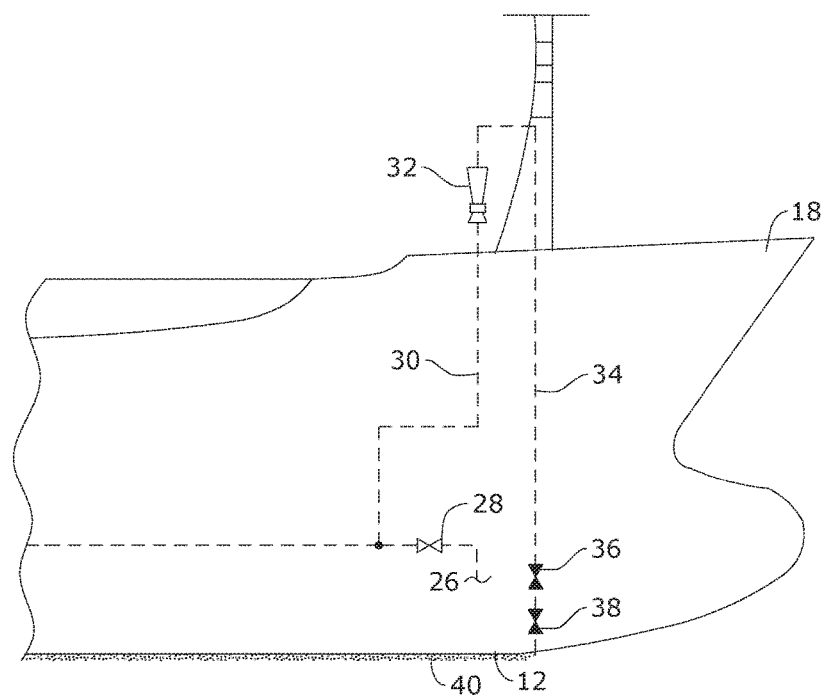
FIG. 2 shows a detail view of one embodiment of the present invention.
Figure 3:
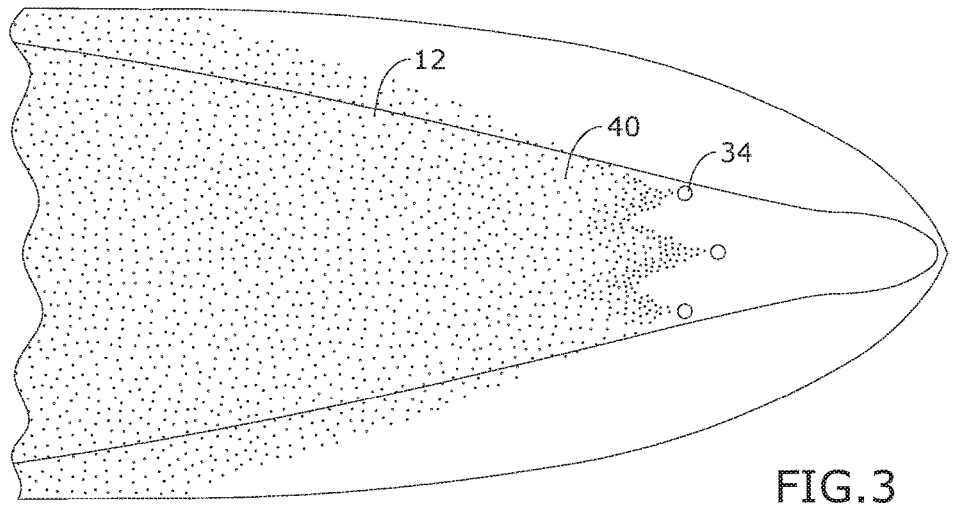
FIG. 3 shows a bottom schematic view of one embodiment of the present invention.

Turning to FIG. 2, a ballast pump 22 is mechanically coupled to a ballast main pipe 24 which is further connected to a forward peak tank 26 with a forward peak tank valve 28. The ballast main pipe 24 is further mechanically coupled to a riser pipe 30. Above the ship hull 12, the riser pipe 30 is attached to a venturi injector 32 which is further attached to a return pipe 34 the return pipe 34 pierces the ship hull 12. The return pipe 34 is attached to a first hull shut off valve 36 and a second hull shut off valve 38.

When the forward peak tank valve 28 is closed the ballast pump 22 pulls water 16 from outside the ship hull 12 into the riser pipe 30. From there the water 16 becomes aerated with air from the venturi injector 32 that creates an air water mixture further comprising microbubbles 40. The air water mixture further comprising the microbubbles 40 is pushed beneath the ship hull 12.

It is easier to travel through air than water because air is less dense. The air water mixture is less dense than the water otherwise would be and therefore less energy is required to move through the air water mixture.

Figure 4:
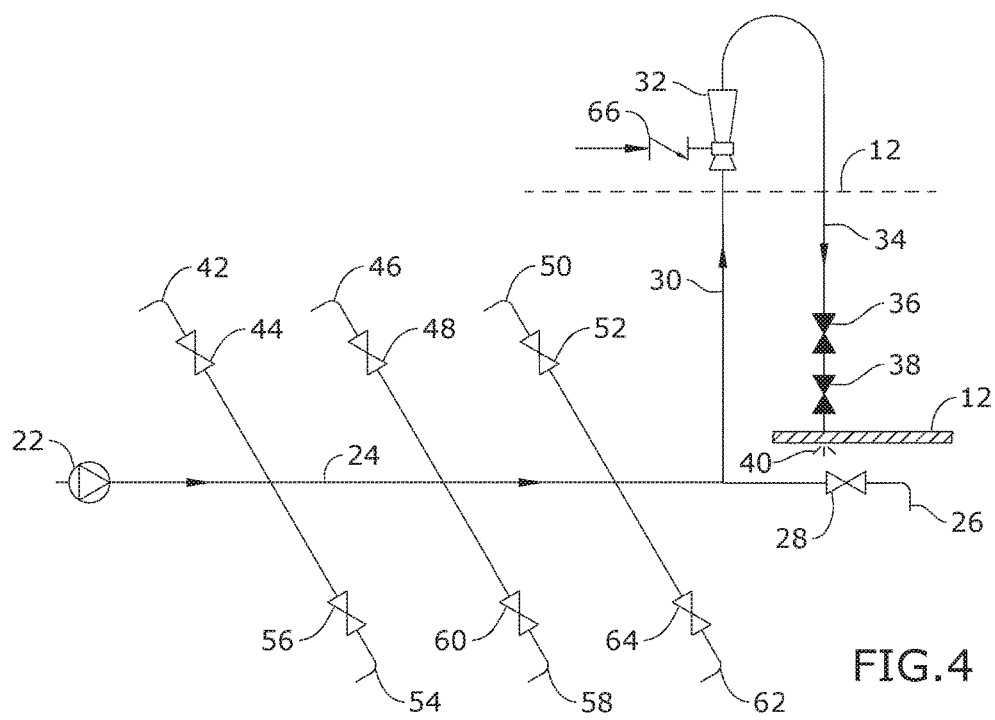
FIG. 4 shows a schematic diagram of system components of one embodiment of the present invention.

Turning to FIG. 4, in some shipboard configurations there is a first port peak tank 42 joined to the ballast main pipe 24 with a first port peak tank valve 44. A second port peak tank 46 joined to the ballast main pipe 24 with a second port peak tank valve 48. A third port peak tank 50 joined to the ballast main pipe 24 with a third port peak tank valve 52. A first starboard peak tank 54 joined to the ballast main pipe 24 with a first starboard peak tank valve 56. A second starboard peak tank 58 joined to the ballast main pipe 24 with a second starboard peak tank valve 60. A third starboard peak tank 62 joined to the ballast main pipe 24 with a third starboard peak tank valve 64.

In some embodiments the venturi injector 32 can be joined to an air intake non-return valve 66 to ensure that air travels in a single direction. The venturi injector 32 and the air intake non-return valve 66 are above the ship hull 12. This distance above the ship hull 12 can be determined by the specifications of the ballast pump 22.

Figure 5:
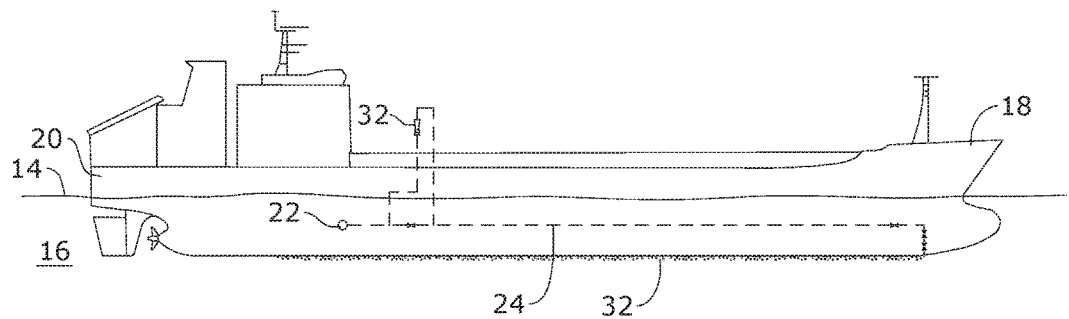
FIG. 5 shows a schematic view of one embodiment of the present invention.
Figure 6:
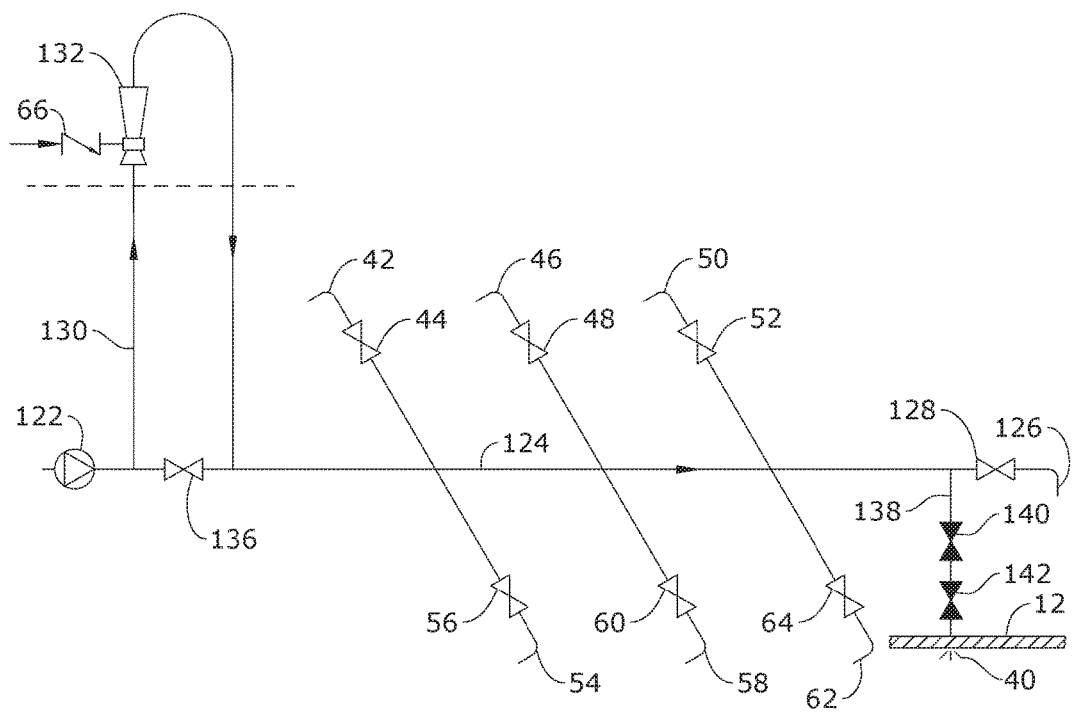
FIG. 6 shows a schematic diagram of system components of one embodiment of the present invention.

Turning to FIG. 5 and FIG. 6, a ballast pump 122 is mechanically coupled to a ballast main pipe 124 which is further connected to a forward peak tank 126 with a forward peak tank valve 128. The ballast main pipe 124 is further mechanically coupled to a riser pipe 130. Above the ship hull 12, the riser pipe 130 is attached to a venturi injector 132 which is further attached to a return pipe 134. The return pipe 134 pierces the ship hull 12. There is a rise pipe cutoff valve 136 on the ballast main pipe 124. The ballast main pipe 124 is joined to a discharge pipe 138. The discharge pipe 138 is attached to a first hull shut off valve 140 and a second hull shut off valve 142. The discharge pipe 138 pushes the water air mixture though the ship hull 12.

Figure 7:
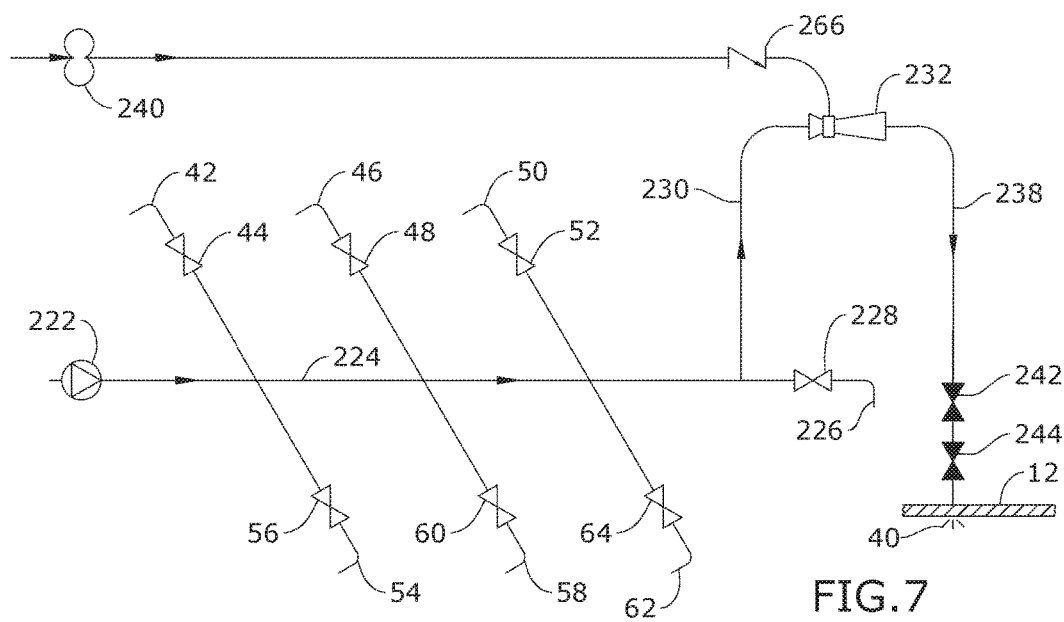
FIG. 7 shows a schematic diagram of system components of one embodiment of the present invention.

Turning to FIG. 7, a ballast pump 222 is mechanically coupled to a ballast main pipe 224 which is further connected to a forward peak tank 226 with a forward peak tank valve 228. The ballast main pipe 224 is joined to a venturi injector 232 with a riser pipe 230. Here, the location of the venturi injector 232 relative to the top of the hull is irrelevant because a positive displacement lobe pump 240 is connected to the venturi injector 232 with an air intake non-return valve 266. The venturi injector 232 is joined to a discharge pipe 238. The discharge pipe 238 is attached to a first hull shut off valve 242 and a second hull shut off valve 244. The discharge pipe 238 pushes the water air mixture though the ship hull 12.

Figure 8:
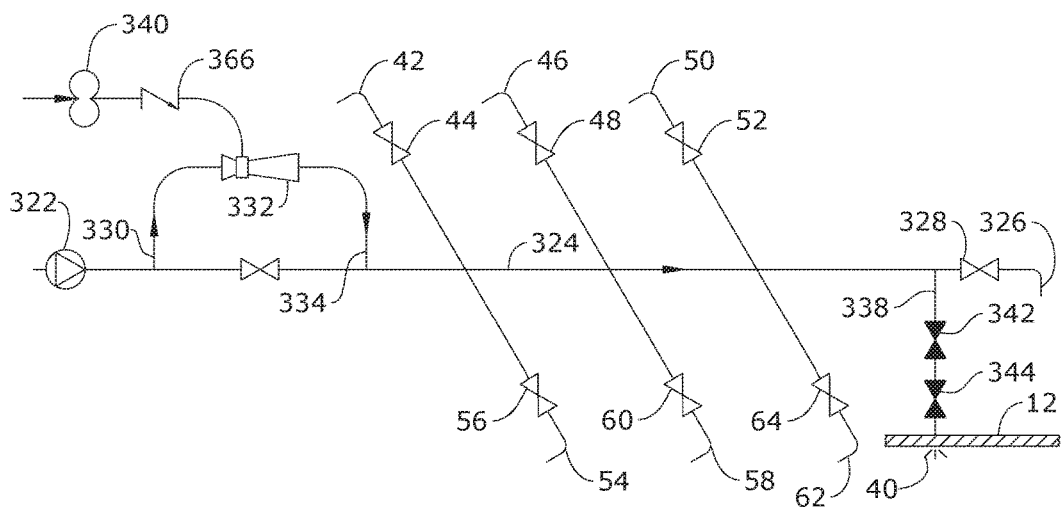
FIG. 8 shows a schematic diagram of system components of one embodiment of the present invention.

Turning to FIG. 8, a ballast pump 322 is mechanically coupled to a ballast main pipe 324 which is further connected to a forward peak tank 326 with a forward peak tank valve 328. The ballast main pipe 324 is joined to a venturi injector 332 with a riser pipe 330. Here, the location of the venturi injector 332 relative to the top of the hull is irrelevant because a positive displacement lobe pump 340 is connected to the venturi injector 332 with an air intake non-return valve 366. The venturi injector 332 is joined back to the ballast main pipe 324 with a return pipe 334. The ballast main pipe 324 is attached to a discharge pipe 338. The discharge pipe 338 is attached to a first hull shut off valve 342 and a second hull shut off valve 344. The discharge pipe 338 pushes the water air mixture though the ship hull 12.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A ship hull microbubble system, adapted to reduce drag on a ship hull traveling through water; the ship hull microbubble system comprising:
    a ballast pump, mechanically coupled to a ballast main pipe which is further connected to a forward peak tank with a forward peak tank valve;
    a venturi injector, joined to the ballast main pipe with a riser pipe;
    a positive displacement lobe pump connected to the venturi injector in order to push air into the venturi injector;
    a discharge pipe, joined to the venturi injector and further piercing the ship hull;
    an air water mixture, formed when water pulled into the ballast pump receives air from the venturi injector;
    wherein discharging the air water mixture through the discharge pipe creates a plurality of microbubbles against the ship hull that reduces the drag on the ship hull when travelling through water.

2. The ship hull microbubble system of claim 1, further comprising a return pipe, connecting the venturi injector and the ballast main pipe.

\* \* \* \* \*